(12) United States Patent
Shang et al.

(10) Patent No.: US 10,413,894 B2
(45) Date of Patent: Sep. 17, 2019

(54) CATALYSTS FOR DEGRADATION OF ORGANIC POLLUTANTS IN PRINTING AND DYEING WASTEWATER AND METHOD OF PREPARATION THEREOF

(71) Applicant: THE HONG KONG RESEARCH INSTITUTE OF TEXTILES AND APPAREL LIMITED, Hong Kong (CN)

(72) Inventors: Songmin Shang, Hong Kong (CN); Enling Hu, Hong Kong (CN); Xiao-ming Tao, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 92 days.

(21) Appl. No.: 15/558,723

(22) PCT Filed: May 26, 2016

(86) PCT No.: PCT/CN2016/083436
§ 371 (c)(1),
(2) Date: Sep. 15, 2017

(87) PCT Pub. No.: WO2017/197660
PCT Pub. Date: Nov. 23, 2017

(65) Prior Publication Data
US 2018/0093260 A1    Apr. 5, 2018

(30) Foreign Application Priority Data

May 20, 2016  (CN) .......................... 2016 1 0341696

(51) Int. Cl.
*B01J 37/02*     (2006.01)
*B01J 37/04*     (2006.01)
(Continued)

(52) U.S. Cl.
CPC ........... *B01J 37/0072* (2013.01); *B01J 21/18* (2013.01); *B01J 23/00* (2013.01); *B01J 23/34* (2013.01);
(Continued)

(58) Field of Classification Search
CPC ...... B01J 21/18; B01J 21/185; B01J 37/0072; B01J 37/0201; B01J 37/0236; B01J 37/08
See application file for complete search history.

(56) References Cited

U.S. PATENT DOCUMENTS

| 8,841,465 B2 * | 9/2014 | Chenevier ............ C07D 307/62 549/315 |
| 2010/0139823 A1 * | 6/2010 | Gash ....................... C06B 45/00 149/17 |

(Continued)

OTHER PUBLICATIONS

Hu (Catalytic Ozonation of Simulated Textile Dyeing Wastewater Using Mesoporous Carbon Aerogel Supported Copper Oxide Catalyst, Journal of Cleaner Production, 112 (2016), p. 4710-4718).*

(Continued)

*Primary Examiner* — Jun Li
(74) *Attorney, Agent, or Firm* — Law Offices of Albert Wai-Kit Chan, PLLC

(57) ABSTRACT

This invention discloses a method for preparing a catalyst for catalyzing the degradation of organic pollutants in printing and dyeing wastewater by ozone, wherein the catalyst comprises a porous carbon material as a substrate and metal oxide nanoparticles deposited on the surface of the substrate. The method comprises the steps of: allowing a mixture of resorcinol, formaldehyde, trimethylhexadecyl ammonium bromide, multi-walled carbon nanotubes and deionized water to react to form cured product, which is then calcinated and carbonized at high temperature to produce the porous carbon material; impregnating the resulting porous carbon material with nitrate solution, drying the porous (Continued)

carbon material, and calcinating it at high temperature, wherein the absorbed nitrate is decomposed into metal oxide and embedded into the porous carbon material. Depending on the requirement of applications, the raw material for preparation of the catalyst of the present invention can be pulverized to screen out the appropriate particle size to fit into practical engineering applications. With the optimization of catalytic oxidation process, the catalyst can be used to promote the rapid degradation of organic matter in printing and dyeing wastewater by ozonation, and the percentage of degradation can be greatly improved. As a result, indicators of wastewater, including the chromaticity and COD, can be significantly reduced.

12 Claims, 1 Drawing Sheet

(51) Int. Cl.
| | | |
|---|---|---|
| *B01J 37/08* | (2006.01) | |
| *B01J 21/18* | (2006.01) | |
| *B01J 23/00* | (2006.01) | |
| *B01J 37/00* | (2006.01) | |
| *B01J 23/70* | (2006.01) | |
| *C02F 1/78* | (2006.01) | |
| *B01J 35/10* | (2006.01) | |
| *C02F 1/72* | (2006.01) | |
| *B01J 23/34* | (2006.01) | |
| *B01J 35/00* | (2006.01) | |
| *B01J 35/02* | (2006.01) | |
| *C02F 101/30* | (2006.01) | |
| *C02F 103/30* | (2006.01) | |

(52) U.S. Cl.
CPC ........... *B01J 23/70* (2013.01); *B01J 35/0013* (2013.01); *B01J 35/023* (2013.01); *B01J 35/1023* (2013.01); *B01J 35/1061* (2013.01); *B01J 37/0201* (2013.01); *B01J 37/04* (2013.01); *B01J 37/08* (2013.01); *B01J 37/088* (2013.01); *C02F 1/725* (2013.01); *C02F 1/78* (2013.01); *B01J 37/0236* (2013.01); *C02F 2101/30* (2013.01); *C02F 2103/30* (2013.01)

(56) References Cited

U.S. PATENT DOCUMENTS

| | | | |
|---|---|---|---|
| 2010/0187484 A1* | 7/2010 | Worsley | B82Y 30/00 252/510 |
| 2010/0190639 A1* | 7/2010 | Worsley | B01J 21/063 502/183 |
| 2011/0027162 A1* | 2/2011 | Steiner, III | B82Y 30/00 423/440 |
| 2012/0028798 A1* | 2/2012 | Worsley | B01J 21/18 502/439 |
| 2013/0165689 A1* | 6/2013 | Baumann | C07C 227/02 562/526 |
| 2013/0202890 A1* | 8/2013 | Kong | H01B 1/02 428/402 |
| 2016/0045841 A1* | 2/2016 | Kaplan | B01J 19/0093 429/49 |

OTHER PUBLICATIONS

Zhou (Ultralight Multiwalled Carbon Nanotube Aerogel, ACS Nano, vol. 4, No. 12 (2010), p. 7293-7302).*
Haghgoo et al (Characterization of multi-walled carbon nanotube dispersion in resorcinol-formaldehyde areogels, Microporous and Mesoporous Materials 184, (2014), pp. 97-104).*

* cited by examiner

CATALYSTS FOR DEGRADATION OF ORGANIC POLLUTANTS IN PRINTING AND DYEING WASTEWATER AND METHOD OF PREPARATION THEREOF

FIELD OF THE INVENTION

This invention relates to the application of ozonation catalysts in wastewater, specifically catalysts used for catalyzing the degradation of organic pollutants in printing and dyeing wastewater by ozone. This invention also discloses methods to prepare the catalysts.

BACKGROUND OF THE INVENTION

Over the decades, textile printing and dyeing industry has long been one of the real economy in China with flourishing development, which has laid a solid foundation in the past few decades for the economic development in China, as a result it has accounted for a remarkable growth of Gross Domestic Product (GDP). So far, China is well known as the largest exporter of textile products, and the textile printing and dyeing industry is one of the top earners of foreign currency. However, the textile printing and dyeing industry is also considered a typical high-polluting industry, because the printing and dyeing process requires large quantities of water and high energy, leading to large wastewater discharge and high pollution, therefore it has caused serious environmental problems. Meanwhile, the major factor associated with the environmental pollution is the large quantity of effluent discharge. It is because the wet processing of textile materials usually cannot take full advantage of the dosing of the dyeing chemicals. For instance, depending on different processes applied, dyeing 1 kg of cotton fabric with reactive dye requires about 70-150 kg of water. Despite the gradual improvement of the dyeing process and technology, there are about 10-40% of the reactive dyes that cannot be fully fixed to the fabric due to various reasons during the processing. These dyes are hydrolyzed afterwards and cannot be recycled, then it is usually discharged with dyeing wastewater. Since the waste effluents are colored and highly polluting, discharging untreated wastewater to the environment would cause serious ecological pollution problems. Therefore, appropriate wastewater treatment processes are essential.

The most conventional treatment of dyeing and printing wastewater is based on biological treatment. Due to lower handling cost, biological treatment has always been the preferred processes for the majority of treatment plants. However, one of the most outstanding shortcomings of this technique is that it requires lengthy processing time, which results in unsatisfactory efficiency. Furthermore, there is more strict discharge standards for printing and dyeing wastewater, so that the effectiveness of the biological treatment is gradually weakened. In recent years, processes and techniques based on advanced oxidation processes (AOPs) have been developed, including UV photocatalysts, catalytic ozonation and electrochemical oxidation etc. Among these techniques, catalytic ozonation has relatively better application prospect when compared with other methods. However, high energy consumption in oxidation by catalytic ozonation has always been the major issue. One of the most important technical barrier is the development of efficient catalysts, while improving ozonation efficiency for various organic pollutants and ensuring the enhanced catalytic degradation with reduced ozone consumption, how to avoid catalyst poisoning is a big engineering challenge.

DETAILED DESCRIPTION OF THE INVENTION

The goal of this invention is to provide a catalyst for catalyzing the degradation of organic pollutants in printing and dyeing wastewater by ozone and the method of preparation, in order to overcome the existing problems in the catalytic oxidation.

In order to tackle the aforementioned technical problems, the present invention discloses a method for preparing a catalyst for catalyzing the degradation of organic pollutants in printing and dyeing wastewater, wherein the catalyst comprises a porous carbon material as a substrate and metal oxide nanoparticles deposited on the surface of the substrate, wherein the method comprises the steps of:

Step S1: allowing a mixture of resorcinol, formaldehyde, trimethylhexadecyl ammonium bromide, multi-walled carbon nanotubes and deionized water to react to form a cured product, which is then calcinated and carbonized at high temperature to produce the porous carbon material;

Step S2: impregnating the porous carbon material with a nitrate solution, drying the porous carbon material, and calcinating it at high temperature, wherein the absorbed nitrate salt is decomposed into a metal oxide and embedded into the porous carbon material.

Preferably, step S1 comprises following steps:

dissolving 11 g of resorcinol in 22-90 mL of water with stirring, and adding 0.3-0.5 g of trimethylhexadecyl ammonium bromide;

stirring the mixture thoroughly, adding 0.2-0.5 g of multi-walled carbon nanotubes, and transferring the mixture to a water bath at room temperature for ultrasonic dispersion treatment until the multi-walled carbon nanotubes are evenly dispersed in the mixture;

sonicating the dispersion for 120-150 min, adding 4.6-18.5 ml of formaldehyde solution and mixing thoroughly;

transferring the dispersion to a sealed pressure glass reagent bottle and allowing the dispersion to react for 20-24 h at 70-85° C. in a water bath, wherein the dispersion mixture changes from an orange liquid to a tan solid;

putting the glass reagent bottle containing the tan solid into an oven at 105-110° C. and allowing to react for 5 days;

collecting the resulting solid from the sealed glass reagent bottle, allowing the solid to dry naturally for 2 days under normal temperature and pressure, and drying the solid in an infrared drying oven at 105-110° C. for 20-24 h; and calcinating the resulting solid in a tube furnace at 700-900° C. for 2-3 h under nitrogen to afford the porous carbon material.

Preferably, step S2 comprises following steps:

pulverizing the resulting porous carbon material and collecting particles having a size of 10-50 mesh;

weighing 5-10 g of the porous carbon material particles, and transferring them into 50-100 mL of a nitrate solution with concentration ranging from 0.1 to 0.5 mol/L;

soaking the porous carbon material particles thoroughly by stirring at room temperature, and transferring the mixture to a water bath under constant temperature and steady shaking for 24 h;

collecting the impregnated porous carbon material particles, and drying them at 60° C. for 24 h and then 105° C. for 4-8 h;

calcinating the resulting particles in a tube furnace at 400-650° C. for 3-5 h under the protection of nitrogen to afford the catalyst.

Preferably, the nitrate is selected from the group consisting of cobalt nitrate, ferric nitrate, copper nitrate, nickel nitrate, manganese nitrate, or a combination thereof.

Accordingly, the present invention also provides a catalyst for catalyzing the degradation of organic pollutants in printing and dyeing wastewater, which is prepared by the method as described above, wherein the catalyst comprises the porous carbon material as the substrate and the metal oxide nanoparticles are deposited on the surface of the substrate, wherein the metal oxide nanoparticles have weight percentage ranging from 3-10%.

Preferably, the porous carbon material has pore size ranging from 7 to 16 nm and specific surface area ranging from 540 to 650 $m^2/g$.

Accordingly, the present invention also provides a use of the catalyst as described above for catalyzing the degradation of organic pollutants in printing and dyeing wastewater by ozonation.

Comparing with the conventional catalysts for ozonation, the present invention has following advantages: the characteristics of the catalyst can be modified by adjusting the method of preparation to cope with the nature of the target pollutants; the applicability of the catalyst is outstanding, because the morphology of the catalytic material can be optimized according to the actual application; the catalytic activity is remarkable such that the degradation rate of the dye pollutants can be effectively improved; and the catalytic performance is stable, which can reduce the loss of catalyst in the course of applications.

BRIEF DESCRIPTION OF THE FIGURES

To illustrate technical solutions according to embodiments of the present invention or the prior art more clearly, the accompanying figures for describing the embodiments or the prior art are briefly introduced as follows. Apparently, the accompanying figures describe only some embodiments of the present invention, and persons of ordinary skill in the art can derive other figures from such accompanying figures without any creative effort.

EXAMPLE

Figure 1:
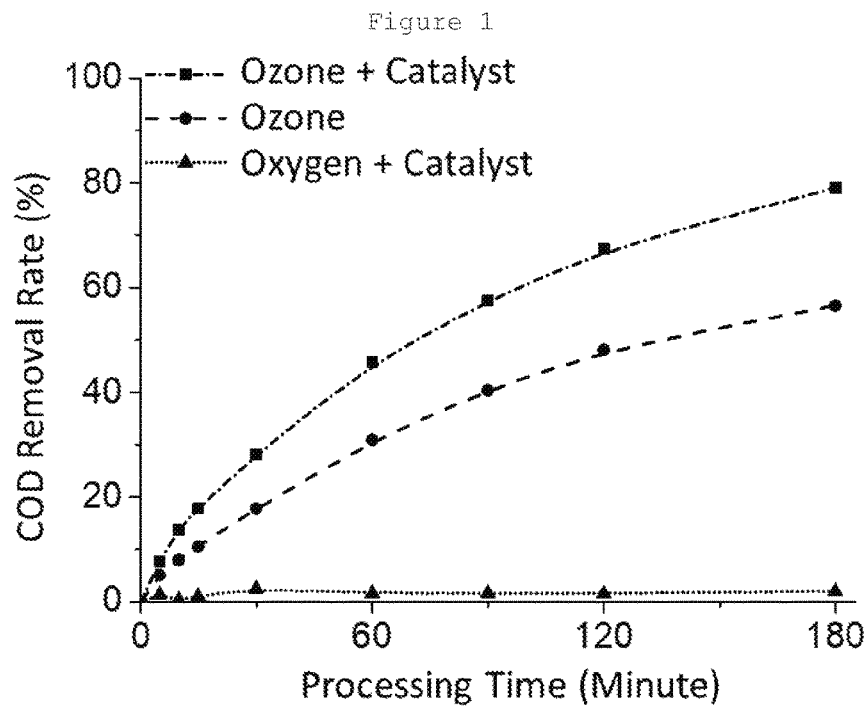
FIG. 1 shows the COD (Chemical Oxygen Demand) removal in dyeing wastewater under three different conditions.

The following clearly describes the technical solutions in the embodiments of the present invention h reference to the accompanying figures in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention provides a catalyst for catalyzing the degradation of organic pollutants in printing and dyeing wastewater, wherein the catalyst comprises a porous carbon material as a substrate and metal oxide nanoparticles deposited on the surface of the substrate, wherein the metal oxide nanoparticles have weight percentage ranging from 3-10%, the porous carbon material has pore size ranging from 7 to 16 nm and specific surface area ranging from 540 to 650 $m^2/g$.

The present invention further provides a method of preparing a catalyst for catalyzing the degradation of organic pollutants in printing and dyeing wastewater, comprising the following steps:

Step S1: allowing a mixture of resorcinol, formaldehyde, trimethylhexadecyl ammonium bromide, multi-walled carbon nanotubes and deionized water to react to form a cured product, which is then calcinated and carbonized at high temperature to produce the porous carbon material;

Step S2: impregnating the porous carbon material with a nitrate solution, drying the porous carbon material, and calcinating it at high temperature, wherein the absorbed nitrate is decomposed into a metal oxide and embedded to the porous carbon material.

Preferably, step S1 comprises following steps:

dissolving 11 g of resorcinol in 22-90 mL of water with stirring, and adding 0.3-0.5 g of trimethylhexadecyl ammonium bromide;

stirring the mixture thoroughly, adding 0.2-0.5 g of multi-walled carbon nanotubes, and transferring the mixture to a water bath at room temperature for ultrasonic dispersion treatment until the multi-walled carbon nanotubes are evenly dispersed in the mixture;

sonicating the dispersion for 120-150 min, adding 4.6-18.5 ml of formaldehyde solution and mixing thoroughly;

transferring the dispersion to a sealed pressure glass reagent bottle and allowing the dispersion to react for 20-24 h at 70-85° C. in a water bath, wherein the dispersion mixture changes from an orange liquid to a tan solid;

putting the glass reagent bottle containing the tan solid into an oven at 105-110° C. and allowing to react for 5 days;

collecting the resulting solid from the sealed glass reagent bottle, allowing the solid to dry naturally for 2 days under normal temperature and pressure, and drying the solid in an infrared drying oven at 105-110° C. for 20-24 h; and calcinating the resulting solid in a tube furnace at 700-900° C. for 2-3 h under nitrogen to afford the porous carbon material.

Preferably, step S2 comprises following steps:

pulverizing the resulting porous carbon material and collecting particles having a size of 10-50 mesh;

weighing 5-10 g of the porous carbon material particles, and transferring them into 50-100 mL of nitrate solution with concentration ranging from 0.1 to 0.5 mol/L;

soaking the particles thoroughly by stirring at room temperature, and transferring the mixture to a water bath under constant temperature and steady shaking for 24 h;

collecting the impregnated porous carbon material particles, and drying them at 60° C. for 24 h and then 105° C. for 4-8 h;

calcinating the resulting particles in a tube furnace at 400-650° C. for 3-5 h under the protection of nitrogen to afford said catalyst.

Example 1

Preparation of Porous Carbon Material:

11 g of resorcinol was dissolved in 50 mL of water with stirring, then 0.3 g of trimethylhexadecyl ammonium bromide was added; after dissolution, 0.3 g of multi-walled carbon nanotubes was added, and the mixture was transferred to a water bath at room temperature for ultrasonic dispersion treatment for 120 min; 10 ml of formaldehyde solution was added, and was mixed thoroughly, then the mixture was transferred to a sealed pressure glass reagent bottle and was allowed to react in a water bath at 70° C. for 24 h. After curing, the dispersion changed to a tan solid and was kept in an oven at 105° C., and allowed to react for 5 days. The resulting solid was collected from the sealed glass reagent bottle, and the solid was allowed to dry naturally for 2 days under normal temperature and pressure, then the solid was dried in an infrared drying oven at 105° C. for 20 h. Lastly, the resulting solid was calcinated in a tube furnace at 800° C. for 2 h under nitrogen to afford the porous carbon material with pore size of 15 nm and specific surface area of 612 $m^2/g$.

Preparation of Catalyst:

According to specific application, the resulting porous carbon material was pulverized, and particles having a size of 20-30 mesh were collected. 10 g of the particles were weighed, and transferred into 50 mL of a cobalt nitrate solution with a concentration of 0.5 mol/L. The particles were soaked thoroughly by stirring at room temperature, and the mixture was transferred to a water bath at 45° C. and steadily shaking at constant oscillation rate of 400 rpm for 24 h. The black impregnated carbon material particles were collected, and dried at 60° C. for 24 h and then at 105° C. for 4 h; the resulting particles were calcinated in a tube furnace at 650° C. for 5 h under the protection of nitrogen to afford the catalyst.

Application of the Catalyst for Catalyzing the Degradation of Dye in Wastewater:

1 g of the catalyst was weighed and added to a reaction flask containing a dyestuff (C.I. Reactive Black 5), simulating catalytic degradation of dye contaminants in wastewater via catalytic oxidation by ozone (aeration). Reaction conditions: reaction temperature was 30° C., pH=5.1 (at initial concentration of dyestuff), ozone aeration rate was 4.0 g/min, and initial concentration of dyestuff was 0.8 g/L (initial COD was 625 mg/L). FIG. 1 shows the COD removal in dyeing wastewater under three different conditions, including catalytic ozonation (ozone and catalyst), ozonation alone (ozone) and physical adsorption of the catalyst (oxygen and catalyst). As illustrated in FIG. 1, the catalytic activity of the new catalyst is remarkable. When comparing with ozonation alone, the efficiency of the catalytic ozonation was improved by about 50%. Since the physical adsorption capacity of the catalyst is relatively low, it is almost incomparable to the overall removal rate of COD, and it can be confirmed that the catalytic mechanism of the catalyst is based on chemical catalytic oxidation instead of physical adsorption.

Figure 2:
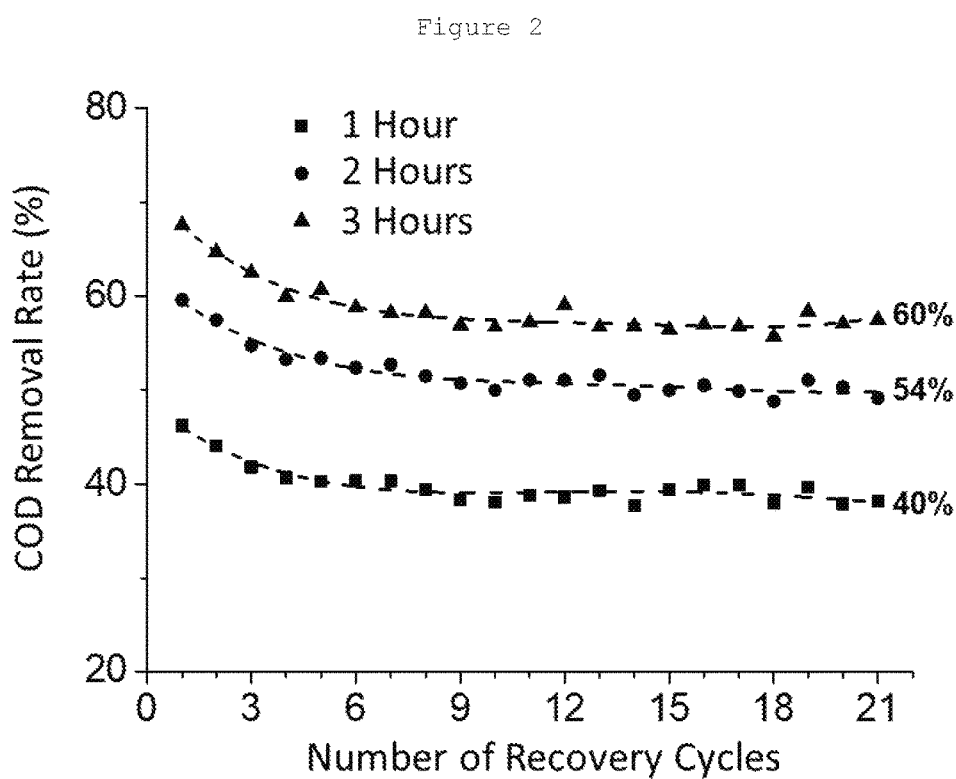
FIG. 2 shows the COD removal in dyeing wastewater under three different recycle conditions.

Recovery Performance Test of Catalyst:

1 g of the catalyst was weighed and added to a reaction flask containing a dyestuff (C.I. Reactive Blue 19), simulating catalytic degradation of dye contaminants in wastewater via catalytic oxidation by ozone (aeration). Reaction conditions: reaction temperature was 60° C., pH=5.64 (at initial concentration of dyestuff), ozone aeration rate was 2.5 g/min, and initial concentration of dyestuff was 0.8 g/L (initial COD was 722 mg/L). After each recovery test (catalytic degradation) was complete, the catalyst was filtered out from the reaction flask and used directly in the subsequent recovery test. FIG. 2 shows the COD removal in dyeing wastewater under three different recovery conditions. The duration of each recovery test is 1 hour, 2 hours, and 3 hours, respectively. As illustrated in the figure, the catalytic activity of the new catalyst is relatively stable. Although there was slight reduction in catalytic efficiency in first 6 runs, the process of COD removal rate remained stable in the subsequent trials. The reduction in the initial runs might be ascribed to potential leaching of "loose" metal oxide particles on the catalyst surface. After the 6th runs, the catalytic efficiency of the catalyst was becoming steady.

Example 2

Preparation of Porous Carbon Material:

11 g of resorcinol was dissolved in 70 mL of water with stirring, then 0.5 g of trimethylhexadecyl ammonium bromide was added; after dissolution, 0.2 g of multi-walled carbon nanotubes was added, and the mixture was transferred to a water bath at room temperature for ultrasonic dispersion treatment for 100 min; 15 ml of formaldehyde solution (37%) was added, and was mixed thoroughly, then it was transferred to a sealed pressure glass reagent bottle and was allowed to react in a water bath at 75° C. for 20 h. After curing, the dispersion changed to a tan solid and was kept in an oven at 102° C. and allowed to react for 5 days. The resulting solid was collected from the sealed glass reagent bottle, and the solid was allowed to dry naturally for 2 days under normal temperature and pressure, then the solid was dried in an infrared drying oven at 102° C. for 24 h. Lastly, the resulting solid was calcinated in a tube furnace at 900° C. for 3 h under nitrogen, the porous carbon material obtained was the substrate of the catalyst. The porous carbon material obtained by the aforementioned process has pore size of 11 nm and specific surface area of 570 $m^2/g$.

Preparation of Catalyst:

According to specific application, the resulting porous carbon material was pulverized, and particles having a size of 20-30 mesh were collected. 15 g of the particles were weighed, and transferred into 80 mL of a copper nitrate solution with a concentration of 0.2 mol/L. The particles were soaked thoroughly by stirring at room temperature, and the mixture was transferred to a water bath at 40° C. and steadily shaking at constant oscillation rate of 600 rpm for 24 h. The black impregnated carbon material particles were collected, and dried at 60° C. for 24 h and then at 105° C. for 6 h; the resulting particles were calcinated in a tube furnace at 450° C. for 4 h under the protection of nitrogen to afford the catalyst.

Application of Catalyst for Catalytic Degradation of Dye in Wastewater:

1 g of the catalyst was weighed and added to a reaction flask containing a dyestuff (C.I. Reactive Black 5), simulating catalytic degradation of dye contaminants in wastewater via catalytic oxidation by ozone (aeration). Reaction conditions: reaction temperature was 30° C., pH=5.1 (at initial concentration of dyestuff), ozone aeration rate was 4.0 g/min, and initial concentration of dyestuff was 0.8 g/L (initial COD was 625 mg/L). The COD removal rate of the catalyst prepared by the preceding method was 57%.

The description disclosed above are only preferred embodiments of the present invention, and are not meant to limit the scope of the invention, which is defined by the claims following thereafter. Those skilled in the art will readily understand the implementation of the embodiments described above that detailed all or part of the processes, and those variations equivalent to the claims of the present invention shall fall within the protection scope of the present invention.

What is claimed is:

1. A method for preparing a catalyst for catalyzing the degradation of organic pollutants in printing and dyeing wastewater, wherein the method comprises:

Step s1: allowing a mixture of resorcinol, formaldehyde solution, trimethylhexadecyl ammonium bromide, multi-walled carbon nanotubes and deionized water to react to form a cured product, which is then calcinated and carbonized to produce a porous carbon material;

Step s2: impregnating the porous carbon material with a nitrate solution wherein nitrate salt is absorbed on said porous carbon material, and calcinating said porous carbon material at high temperature, wherein the absorbed nitrate salt decomposes into metal oxide nanoparticles on said porous carbon material to form said catalyst.

2. The method of claim 1, wherein said step s1 comprises:
   (a) dissolving the resorcinol in deionized water with stirring, and adding the trimethylhexadecyl ammonium bromide to form a first solution;
   (b) stirring the first solution thoroughly, adding said multi-walled carbon nanotubes to form a second solution, and transferring the second solution to a water bath at room temperature for ultrasonic dispersion treatment until the multi-walled carbon nanotubes are evenly dispersed in the second solution;
   (c) sonicating the second solution resulting from step (b), adding the formaldehyde solution and mixing thoroughly to form a third solution;
   (d) transferring the third solution to a sealed pressure glass reagent bottle and allowing the third solution to react, wherein the third solution changes from an orange liquid to a tan solid;
   (e) putting the sealed pressure glass reagent bottle containing said tan solid into an oven and allowing to react to form said cured product;
   (f) collecting said cured product resulting from step (e) from the sealed pressure glass reagent bottle, allowing said cured product to dry naturally under normal temperature and pressure, and then in an infrared drying oven to form a dried solid; and
   (g) calcinating the dried solid resulting from step (f) in a tube furnace to afford said porous carbon material.

3. The method of claim 1, wherein said step s2 comprises:
   (a) pulverizing said porous carbon material resulting from step s1 to form porous carbon material particles and collecting said porous carbon material particles;
   (b) weighing said porous carbon material particles resulting from step (a), and transferring them into said nitrate solution to form a fourth solution;
   (c) soaking said porous carbon material particles thoroughly in said fourth solution by stirring at room temperature in a container, and transferring said container to a water bath under constant temperature and steady shaking to form impregnated porous carbon material particles;
   (d) collecting and drying said impregnated porous carbon material particles, wherein nitrate salt is absorbed on said porous carbon material particles;
   (e) calcinating said porous carbon material particles with absorbed nitrate salt resulting from step (d) in a tube furnace to afford said catalyst.

4. The method of claim 1, wherein the absorbed nitrate salt is selected from the group consisting of cobalt nitrate, ferric nitrate, copper nitrate, nickel nitrate, manganese nitrate, and a combination thereof.

5. The method of claim 1, wherein said nitrate solution has a concentration ranging from 0.1 to 0.5 mol/l.

6. The method of claim 2, wherein said second solution in step (c) is sonicated for 120-150 min.

7. The method of claim 2, wherein said third solution in step (d) is allowed to react at a temperature ranging from 70 to 85° C. for 20-24 h.

8. The method of claim 2, wherein said tan solid in step (e) is heated in the oven at a temperature ranging from 105 to 110° C. for 20-24 h.

9. The method of claim 2, wherein said dried solid in step (g) is calcinated at a temperature ranging from 700 to 900° C. for 2-3 h.

10. The method of claim 3, wherein said porous carbon material particles have a size ranging from 10 to 50 mesh.

11. The method of claim 3, wherein said impregnated porous carbon material particles in step (d) s dried at 60° C. for 24 h and then 105° C. for 4-8 h.

12. The method of claim 3, wherein said porous carbon material particles with absorbed nitrate salt in step (e) is calcinated at a temperature ranging from 400 to 650° C. for 3-5 h.

* * * * *